Nov. 15, 1938.   L. A. DE BLOIS   2,136,991
MOTION INDICATOR AND VELOCITY METER
Filed Dec. 14, 1936
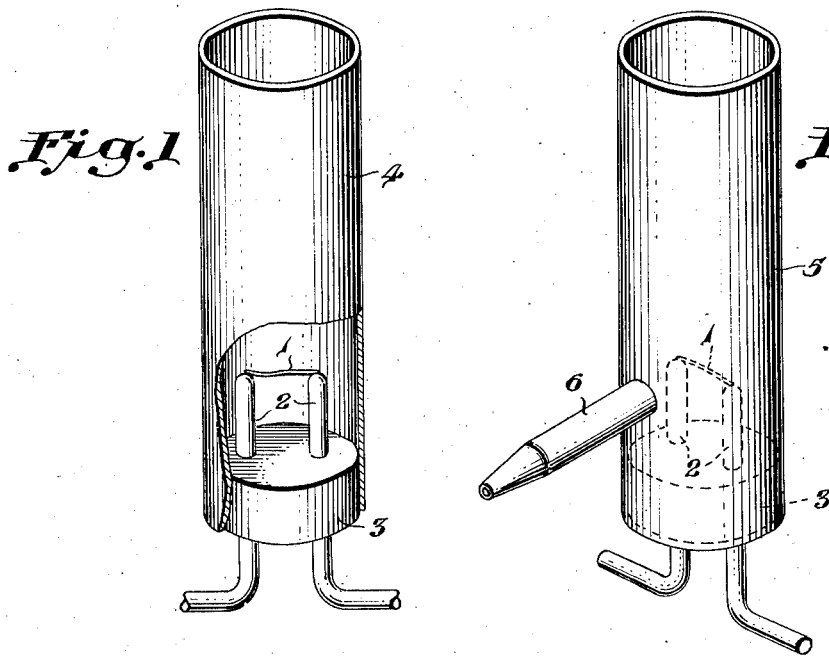
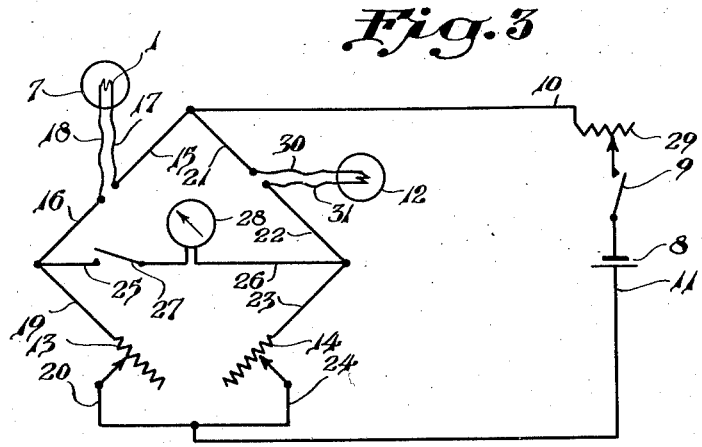
Inventor
Lewis Amory DeBlois

Patented Nov. 15, 1938

2,136,991

UNITED STATES PATENT OFFICE 2,136,991

MOTION INDICATOR AND VELOCITY METER

Lewis Amory De Blois, New York, N. Y.

Application December 14, 1936, Serial No. 115,678

1 Claim. (Cl. 73—2)

This invention relates to the field of physical measurements and, more specifically, to measurements of the flow or other motion of air or other gases, vapors, or other fluids and, conversely, to the motion of bodies moving therein. It has for its objects, first, to provide a device for registering, for purposes of observation, measurement, analysis or record, the motion and characteristics of motion, including velocity, of the said gases or fluids; second, to provide a device for registering, for purposes of observation, measurement, analysis or record, the motion and characteristics of motion, including velocity, of bodies moving through such gaseous or fluid media; third, to provide a device which will permit the aforesaid registrations to be made relative to the state of rest or to a fixed point or plane in space, or relatively, in respect to other motion; fourth, to provide a device which will permit the aforesaid registrations to be made differentially in respect to the direction or directions of the said motion or motions.

My invention attains these objects electrically and principally through utilization of certain mechanical, electrical and thermal principles, as will subsequently appear. It is illustrated in the accompanying drawing which forms a part of this specification. Figure 1 is a view in perspective of the principal responsive component of this invention, hereinafter referred to as "motion detector," with a portion of its separable, protective sleeve broken away. Figure 2 is a view in perspective of the motion detector enclosed in a form of shield designed for use in directional determinations. Figure 3 is a diagrammatic representation of the electrical circuit with conventional symbols to denote the component parts of this invention and their electrical connections.

The motion detector illustrated in Figure 1 is a simple form of the device. It is not possible, however, to portray in a drawing those qualities which peculiarly contribute to its functioning as the principal element upon which the successful operation of this invention chiefly depends. Furthermore, adaptations of the motion detector to meet special conditions of use will naturally bring about modification in its dimensions and outward aspect though not in its basic principles or mode of functioning.

It consists of a short bridge 1 of fine conducting wire affixed at its ends, by solder or other suitable means, to the upper extremities of two conducting posts or terminals 2 2, which are rigidly held and supported by a base 3. These posts, for which copper or brass is a suitable material, serve to sustain the bridge and to conduct electric current to and from it. For the latter purpose they may be furnished with suitable connectors to permit their attachment to the electrical circuit hereinafter described, or, as indicated in Figure 1, they may be merely the extremities of certain wires of the said circuit which have been extended and carried through the base 3, or, if the motion detector is to be moved about independently, the lower extremities of the said posts may be conveniently soldered to flexible conductors which are, in turn, connected to the said circuit. The material of the base may be "Bakelite" or some other substance that is a non-conductor of electricity and is resistant to moderate heat and to the action of the surrounding medium. There is provided also a separable, protective sleeve 4, shown in Figure 1 in fragmentary view. In this form it is continuously cylindrical, open at the top, and fits snugly the periphery of the base 3, but may take any convenient form provided with a single substantial opening communicating to the surrounding medium. It may be composed of aluminum or of other suitable material that is rigid and impervious to the surrounding medium.

The chief requisites of the bridge 1 are: first, susceptibility to material increase in temperature through the passage of an electric current; second, ability to withstand repeated heatings without serious deterioration; third, ability to give up its heat readily to the circumfluent medium; and, fourth, a well-defined and uniform temperature coefficient of resistance. To attain these ends and, at the same time, secure high sensitivity, the cross-sectional area of the bridge is made as small as other considerations will permit, the smallest sizes of commercially obtainable wire being satisfactory for this purpose provided the material withstands oxidation and has a relatively high specific resistance and a suitable temperature coefficient of resistance. Platinum is a suitable material. The length of the bridge is kept as low as practicable—in practice to a small fraction of an inch. Thus, the motion detector may be small, compact, simple, free from moving parts with their inherent friction losses and inertia and, by virtue of the delicate proportions of its bridge, highly sensitive. It may be introduced into very small spaces. Furthermore, the small cross-sectional area of its bridge presents no serious obstruction to the motion of the circumfluent medium or to the detector's movement therein. Moreover, since the contact of the medium with the bridge is the causative element in the latter's functioning, as will be subsequently explained, and its mass, length and cross-section are kept small, the motion detector will respond only to motion in the small transverse area represented by the dimensions of the bridge. But, since its design is conditioned by its use, the nature of the surrounding medium, the velocity of motion, and other practical factors, the aforesaid dimensions are relative only and, together with the form of the bridge, are subject to modification. Thus, for example, where conditions demanded the employment of a somewhat longer bridge, it might appear in the form of a loop or helix in order to keep it still relatively small and compact or attain some other end.

Figure 3 illustrates the preferred mode of connecting the said motion detector to other components of the invention required for its proper functioning. The motion detector itself is conventionally represented by the symbol 7, with its bridge 1. For its functioning there is required a source of electrical energy 8, which may be a primary battery with connecting switch 9 and a controlling rheostat 29. The conducting wires 10 and 11 serve to connect these components to the remainder of the circuit, which is that part hereinafter referred to as the "duplex circuit," and to conduct electricity to and from it. 12 is the component which will be referred to hereinafter as the "control element." It is a duplicate of the motion detector in composition and electrical characteristics. 13 and 14 are variable and adjustable resistance units. They will be referred to hereinafter as "balancing resistances."

The conducting wires 15 and 16, in conjunction with the flexible conductors 17 and 18, and the conducting wires 21 and 22, in conjunction with flexible conductors 30 and 31, and the wires 19, 20, 23 and 24 serve to connect and interconnect the aforesaid components in an electrical circuit that is duplex in character, one branch being formed by the wires 15, 17, 18, 16, 19 and 20 with the components 7 and 13, and the other branch formed by the wires 21, 30, 31, 22, 23 and 24 with the components 12 and 14.

The junction of wires 16 and 19 and the junction of wires 22 and 23 are also interconnected by the conducting wires 25 and 26 with the switch 27 (not absolutely essential to the operation of the invention) and the electrical instrument 28. This portion of the circuit will be referred to hereinafter as the "cross-connection." The instrument 28 may be any suitable type of sensitive, electrical indicating, measuring, or recording device dependent for its functioning on the passage of electric current, such as an ammeter or an oscillograph, provided it is capable of responding to and registering the variations of the current flowing through the cross-connection.

When switch 9 is closed, electric current flowing from source 8 traverses wire 10 to its junction with wires 15 and 21. There dividing, one portion of the current flows through wire 15, flexible conductor 17, bridge 1 of motion detector 7, flexible conductor 18, into wire 16. Thence, if switch 27 is open, this portion of the current flows through wire 19, balancing resistance 13, into wire 20 and thence, by way of wire 11 to the source 8. The other portion of the current, splitting off at the junction of wires 10, 15 and 21, traverses wire 21, flexible conductor 30, control element 12, flexible conductor 31, wire 22, wire 23, balancing resistance 14, and wire 24. At the junction of the latter wire with wires 20 and 11, it unites with the current that has traversed the other branch of the circuit and returns to the source via wire 11.

That portion of the current which passes through bridge 1, reacting on its resistance, generates heat and raises its temperature to a point where further rise is inhibited by increasing heat loss—that is, a condition of thermal equilibrium is attained. Assuming that the material of the bridge has a positive temperature coefficient of resistance, the electrical resistance of the bridge increases until this point is reached and there remains constant so long as the condition of thermal equilibrium is maintained. The opposite branch of the circuit behaves in a similar manner.

Within the duplex circuit, excluding the cross-connection, there are four major elements of resistance: bridge 1, control element 12, and the two balancing resistances 13 and 14. Since each half of each of the two branches of the circuit contains one of these, it is possible, through the design or by adjustment of these resistances, to so balance the circuit that no difference of potential exists between the junction of wires 16, 19 and 25 and the junction of wires 22, 23 and 26. Such a balance is essential to the functioning of this invention and constitutes the preliminary step to its practical use.

In practice, such a balance may be attained by enclosing motion detector 7 and control element 12 in their protective sleeves and placing each at rest in the medium under examination. Then, with switches 9 and 27 closed, balancing resistances 13 and 14 are adjusted until the desired strength of current flows through each branch of the duplex circuit and no current flows through the cross-connection, as indicated by a zero-reading on instrument 28. The circuit is now balanced under conditions in which motion detector and control element are exposed to contact with the medium in state of rest and is in thermal and electrical equilibrium.

Since the bridge gives up its heat more rapidly to a medium in a state of motion than in the state of rest (provided the temperature of the medium is below that of the bridge), any motion of the said medium past the bridge after its protective sleeve has been removed will disturb the thermal equilibrium of the bridge and cause its temperature to fall. This will be attended by a corresponding decrease in its electrical resistance, disturbing the balance of the duplex circuit and causing a current to flow through instrument 28, which thus becomes a means of indicating the presence of motion in the medium under examination.

Within certain limitations, the cooling effect of the medium has a consistent, functional relationship to its velocity and, if the balanced circuit and its components have been properly designed, assembled and adjusted, and the thermal equilibrium of the bridge situated in the opposite branch of the circuit remains undisturbed, the strength of the aforesaid current flowing through instrument 28 will bear a consistent relationship to the velocity of flow of the medium past the exposed bridge. Instrument 28, therefore, if properly selected, may be calibrated to read directly in terms of velocity. If it is an oscillograph, it may be employed to reveal or record the characteristics of motion of the said medium, including its velocity.

And the converse of this application is equally valid; that is to say, if the medium itself is at rest and the exposed bridge be moved about in it through any agency whatsoever, instrument 28 will register electrically the products of this motion as translated by the balanced circuit from the thermal-electrical responses of the bridge.

The foregoing describes the action of the device when only one of its responsive components (e. g., the motion detector) is exposed to the effects of motion while the other responsive component (e. g., the control element) is shielded from them, the resultant registration of the electrical instrument expressing motion in respect to the state of rest or in relation to a fixed point or plane in space. The purpose of my invention, however, is the indication or measurement of motion relative to other motion, whether it be that of other parts of the same medium, that of other media, or that of other moving bodies. I accomplish this by making the motion detector and the control element duplicates of each other. Since either component is capable of functioning reciprocally as detector or control element, it is only necessary to expose both simultaneously to the effects of motion. The electrical impulses proceeding from them when thus exposed will be directionally opposed. The registration of the instrument, therefore, will represent their difference. Hence, the invention may be readily applied to the differential indication and measurement of motion relative to other motion.

While the type of motion detector or control element embodied in this invention has some degree of directional selectivity, dependent upon the positional relation of its bridge to the direction in which the motion is propagated, and this is alterable by appropriate changes in the form of the bridge, the device is not highly sensitive in this respect and yields the same response to motion proceeding in one direction as to motion in the precisely contrary direction, provided their velocities are the same. Therefore, to meet conditions wherein it is necessary to obtain directional differentiation, I have included in the invention the application to the motion detector or control element, or both, of a general type of enclosure which, when used with them, will supply the missing element of directional selectivity.

A simple form of this appliance resembles the protective sleeve 4 of Figure 1 but has a small circular aperture in its cylindrical shell with the axis of the aperture intersecting, approximately, the bridge 1 at its center of length and being normal to the plane of the axes of the posts 2 2. To meet some conditions, the area of the said aperture is enlarged. In a preferred form the aperture is extended outward through the instrumentality of a protruding, communicating tube. This is illustrated in Figure 2 which shows in perspective view the sleeve 5 with protruding tube 6. The sleeve is open at the top.

The aforesaid forms of the appliance, however, are based upon the same principles of directional selectivity and attain their object through utilization of a partial enclosure for the responsive element provided with a means for the entrance of the surrounding medium, which means is directionally selective, together with a means for its escape. Alterations in form, as hereinbefore described, are necessitated by differences in the nature of or in the velocity of the media concerned. In every case, however, directional selection is secured through rotation of the appliance with its enclosed responsive element. This appliance and method of use are applicable to either motion detector or control element, or both, separately or simultaneously, and they may be caused to function alternately thereby as, for example, when applied to the examination of motion in a gas or fluid which is alternately drawn in and ejected through a common orifice. They may be employed also for the analogous purpose of motion-direction finding—often a necessary preliminary step to actual measurement of motion.

I am aware that prior to my invention duplex circuits embodying the balance of elements of electrical resistance situated in each half of their two branches have been in common use—for example, in the conventional Wheatstone bridge circuit—and my claim relates to its use only in respect to its combination with the motion detector and other components hereinbefore described, and for the purposes and by the method also hereinbefore described. But, although employing the said circuit to secure a state of electrical balance in the same way that it is employed in conventional laboratory determinations—that is, by what is termed the "null method"—I wish to point out that in the operation of my invention this constitutes merely a preliminary step to actual indication and measurement of motion in which it is convenient to employ the circuit in this manner, although such balancing could be secured in other ways.

Having described my invention and its mode of operation, I claim:

In a device for registering, for purposes of observation, measurement, analysis, or record, the motion and characteristics of motion, including velocity, of air or other gases, vapors, or other fluid media, or of bodies moving therein, the combination of a motion detector employing as its responsive element a metallic wire heated by the passage of an electric current through it and dependent for its functioning upon changes in the electrical conductivity of the said wire caused by changes in its temperature resulting from alteration of the rate of heat-transfer to the circumfluent medium, which motion detector is provided with a separable, partially-enclosing shield having facilities for the entrance and escape of the circumfluent medium supplied in such way as to render the motion detector directionally selective in respect to its response to motion, a control element which is essentially a duplicate of the said motion detector in its composition and electrical characteristics and is provided with a shield, two adjustable electrical resistances to balance the resistances of motion detector and control element, an electric circuit of conducting wire connecting the said motion detector, control element and resistances, which circuit is duplex in character and adapted to securing a balance of the resistances included within its two branches, a source of electrical energy with controlling rheostat and switch connected to the said circuit, and an electrical registering instrument of such type and so connected to each of the branches of the said circuit as to facilitate securing the said balance and, when this balance is secured and the aforesaid motion detector and control element are subjected in the proper manner to the action or influence of separate motions or separate states, conditions, or directions of motion of or within the same or different media, to register the responses of the said motion detector and control element as transmitted by the circuit differentially in such way that they may represent and, after calibration may be properly interpretable in terms of the directional components of motion and its directional characteristics, differentially expressed.

LEWIS AMORY DE BLOIS.